US00RE43131E

(19) United States
(12) Reissued Patent
Shearer, III et al.

(10) Patent Number: US RE43,131 E
(45) Date of Reissued Patent: Jan. 24, 2012

(54) CARRIER TRACKING CIRCUIT AND METHOD INCLUDING DUAL NUMERICALLY CONTROLLED OSCILLATORS AND FEEDFORWARD PHASE CORRECTION COEFFICIENT

(75) Inventors: Daniel Davidson MacFarlane Shearer, III, Scottsdale, AZ (US); Michael J. Seals, Melbourne, FL (US)

(73) Assignee: Intellectual Ventures I LLC, Wilmington, DE (US)

(21) Appl. No.: 12/658,033

(22) Filed: Jan. 29, 2010 (Under 37 CFR 1.47)

Related U.S. Patent Documents

Reissue of:
(64) Patent No.: 7,324,612
Issued: Jan. 29, 2008
Appl. No.: 10/785,622
Filed: Feb. 23, 2004

U.S. Applications:
(60) Provisional application No. 60/449,042, filed on Feb. 21, 2003.

(51) Int. Cl.
*H04L 27/14* (2006.01)
*H04L 27/16* (2006.01)
*H04L 27/22* (2006.01)

(52) U.S. Cl. ..... 375/326; 375/327; 375/375; 375/371; 375/260

(58) Field of Classification Search ..... 375/326, 375/327, 375, 371, 260, 376, 224, 226–228
See application file for complete search history.

(56) References Cited

U.S. PATENT DOCUMENTS

| | | | | |
|---|---|---|---|---|
| 5,313,169 | A * | 5/1994 | Fouche et al. | 329/302 |
| 5,970,397 | A | 10/1999 | Klank et al. | |
| 6,219,333 | B1 * | 4/2001 | Ahn | 370/203 |
| 6,459,744 | B1 * | 10/2002 | Helard et al. | 375/354 |
| 6,470,030 | B1 * | 10/2002 | Park et al. | 370/480 |
| 6,754,170 | B1 * | 6/2004 | Ward | 370/208 |
| 6,968,027 | B2 | 11/2005 | Fukuhara | |
| 7,046,057 | B1 | 5/2006 | Culler | |
| 7,068,593 | B2 * | 6/2006 | Cho et al. | 370/208 |
| 7,203,261 | B2 | 4/2007 | Gupta | |
| 7,272,175 | B2 * | 9/2007 | Kim et al. | 375/226 |
| 7,738,600 | B2 * | 6/2010 | Kim et al. | 375/326 |
| 2002/0176520 | A1 | 11/2002 | Heegard et al. | |
| 2003/0123582 | A1 | 7/2003 | Kim et al. | |

* cited by examiner

*Primary Examiner* — Phuong Phu

(57) ABSTRACT

A carrier tracking circuit includes a first phase adjustment circuit coupled to an input of a delay element and a second phase adjustment circuit coupled to an output of the delay element. A phase correction circuit is coupled to output of the delay element is operable to generate a phase adjustment value based upon a data symbol output from the delay element. The phase correction circuit includes a double phase correction circuit to prevent double application of the same phase adjustment value to a symbol by both the first and second phase adjustment circuits. The carrier tracking circuit may be used in OFDM communications systems with each data symbol being an OFDM symbol and with the delay element being an FFT. The carrier tracker circuit also may include a feed forward circuit for correcting the phase error of a given data symbol using a phase error generated from that symbol.

54 Claims, 5 Drawing Sheets

CARRIER TRACKING CIRCUIT AND METHOD INCLUDING DUAL NUMERICALLY CONTROLLED OSCILLATORS AND FEEDFORWARD PHASE CORRECTION COEFFICIENT

Matter enclosed in heavy brackets [ ] appears in the original patent but forms no part of this reissue specification; matter printed in italics indicates the additions made by reissue.

PRIORITY CLAIM

This application claims priority from U.S. Provisional Patent Application No. 60/449,042 filed Feb. 21, 2003, which is incorporated herein by reference.

TECHNICAL FIELD

The present invention relates generally to communications systems and more specifically to the correction of frequency offsets between receivers and transmitters in such communications systems.

BACKGROUND OF THE INVENTION

In a typical communications system, a transmitter encodes data to be transmitted and this encoded data is used to modulate a carrier signal which is transmitted over a communications channel to a receiver. The receiver demodulates the received carrier signal to obtain the encoded data and thereafter decodes the encoded data to obtain the original data sent by the transmitter. The type of modulation utilized in the communications system indicates the parameter of the carrier signal that is varied to encode the data onto the carrier signal, such as amplitude, frequency, or phase modulation and combinations thereof, as will be understood by those skilled in the art. One such modulation technique is known as frequency division multiplexing which utilize, instead of a single carrier signal, a number of subcarrier signals at different frequencies that are simultaneously communicated over the communications channel. With frequency division multiplexing a portion of the data being transmitted is modulated onto each of the subcarrier signals.

A frequency division multiplexing modulation technique known as orthogonal frequency division multiplexing (OFDM) has become increasingly popular in recent years for use in wireless communications systems. This is true because the intrinsic characteristics of OFDM allow it to handle the most common types of distortion found in the wireless environment, such as fading of the received signal resulting from the transmitted signal arriving at the receiver over multiple propagation paths due to reflections and objects present between the transmitter and receiver. As a result, many wireless local area networks (WLANs) utilize OFDM in the form of the IEEE 802.11 family of standards that are more commonly referred to as "wireless fidelity" or "Wi-Fi."

In a wireless OFDM communications system, an OFDM signal is formed through the summation of a number of orthogonal subcarriers, each subcarrier having a different frequency and itself being modulated through a particular modulation technique such as quadrature amplitude modulation (QAM). The subcarriers are orthogonal in that the dot product of each subcarrier with any of the other subcarriers is equal to zero, as will be understood by those skilled in the art. This orthogonal property of each subcarrier results in a frequency spectrum for each subcarrier that has a peak frequency component FC positioned between peak frequencies f of adjacent subcarriers and that has frequency nulls positioned at the locations of these adjacent peak frequencies as shown in FIG. 1. The resulting frequency spectrums for these orthogonal subcarriers enable each of these subcarriers to be reliably demodulated from the OFDM signal, with each subcarrier thereafter being demodulated through the appropriate technique, such as QAM, to retrieve the underlying data, as will be understood by those skilled in the art.

The OFDM signal formed by the summation of these orthogonal subcarriers is typically utilized to modulate a radio frequency (RF) carrier signal which, in turn, is the actual signal propagated over the wireless channel. More specifically, a local oscillator in the transmitter typically generates the RF carrier signal and a modulation circuit modulates this carrier signal with the OFDM signal. In the receiver, a local oscillator generates a signal that is applied to a mixer along with the received modulated RF carrier signal to thereby remove the carrier signal portion and provide the original OFDM signal in the receiver.

Although OFDM is well suited for use in wireless communications systems as previously mentioned, there are nonetheless types of distortion that must be compensated for with OFDM just as with any modulation technique. One such type of distortion is frequency-offset distortion that results from a difference between the frequency of an oscillator or RF signal generated by the local oscillator in the OFDM transmitter and the frequency of the RF signal generated by the local oscillator in the OFDM receiver. Such a frequency offset results in the OFDM signal having a frequency offset relative the original OFDM signal in the transmitter, and this type of distortion can adversely affect the performance of the system.

To overcome the problem of frequency offset, the receiver typically includes a carrier tracking circuit that adjusts the frequency of the local oscillator in the receiver to match that of the local oscillator in the transmitter as closely as possible. FIG. 2 is a functional block diagram illustrating a conventional carrier tracking circuit 200 contained in an OFDM receiver for adjusting the frequency of a signal generated by a numerically controlled oscillator (NCO) 202 in the receiver. Although not shown in FIG. 2, the modulated RF signal received from the transmitter (not shown) is first demodulated or "down converted" using a local oscillator signal from a local oscillator (not shown) contained in the receiver. As previously mentioned, ideally the frequency of the local oscillator signal in the receiver is the same as that of the local oscillator in the transmitter that was modulated by the OFDM signal.

Once the RF signal has been down converted to provide the OFDM signal in the OFDM receiver, this OFDM signal is sampled to generate a plurality of samples r(n). The NCO 202 then adjusts the phases of each of these samples to compensate for a frequency offset between the local oscillator in the receiver and the local oscillator in the transmitter, as will now be explained in more detail. Note that OFDM signal in the receiver generated after down conversion is not identical to the OFDM signal in transmitter if there is a frequency offset between the local oscillator in the transmitter and the local oscillator in the receiver. Such a frequency offset results in a linearly cumulative phase error for each sample r(n) of the OFDM signal, as will be understood by those skilled in the art. As result, if the first sample r(n) has a phase error $\theta_{err}$ then the second sample will have a phase offset $2\theta_{err}$, and so on for each sample. Thus, each sample may be viewed as having a phase offset of n times $\theta_{err}$ where n indicates the sample number.

The NCO 202 receives a phase adjustment value PHADJ from a loop filter 204, with the PHADJ value having a value corresponding to the incremental amount by which the phase of each of the samples r(n) is to be adjusted. A summation circuit 206 adds the PHADJ value with a phase increment value PHINC output from a delay circuit 208 to generate an accumulated phase value PHAC that is also input to the delay circuit. The delay circuit 208 outputs the PHAC value on its input as the PHINC value on its output a sample delay time $\tau_s$ later. A second summation circuit 210 subtracts the PHINC value from a phase of the sample r(n) to generate a phase-corrected sample ṙ(n) that is supplied to a fast Fourier transform (FFT) circuit 212. The sample delay time $\tau_s$ corresponds to time between which the samples r(n) are applied to the summation circuit 210.

Once the FFT 212 receives a required number N of the phase-corrected input samples ṙ(n), the FFT executes a fast Fourier transform algorithm to calculate a set of complex frequency components R(1)-R(N). The fast Fourier algorithm is a discrete Fourier transform algorithm that greatly reduces the number of computations required to compute the discrete Fourier transform of the input signal corresponding to the N samples ṙ(n). Each of the frequency components R(1)-R(N) is a complex number giving a magnitude and phase for a corresponding sinusoidal component of the input signal in a given frequency range or "bin" of the FFT 212. Recall that according to Fourier transform theory, a signal may be represented as a summation of sinusoids of different frequencies and varying magnitudes and phases. The frequency components R(1)-R(N) generated by the FFT 212 define the magnitudes and phases of N sinusoids, each at a corresponding frequency, which, when summed together yield the input signal corresponding to the phase-corrected samples ṙ(n). In the just described operation of the FFT 212, a single OFDM symbol that encodes corresponding data is represented by the N phase-corrected input samples ṙ(n).

The carrier tracking circuit 200 further includes a phase error estimator 214 that generates an estimated phase error value EPHE from the frequency components R(1)-R(N) output by the FFT 212. The estimator 214 typically utilizes frequency components R(1)-R(N) having known phase values to calculate the EPHE value. For example, in an OFDM system that complies with the IEEE 802.11 standard, N=64 so that the FFT 212 includes 64 bins and outputs the frequency components R(1)-R(64) in the respective bins. Of these 64 bins, four bins contain what are typically referred to as "pilot tones" having known amplitude and phase values. The phase error estimator 214 determines the estimated phase error value EPHE from phase values of the frequency components R(1)-R(64) corresponding to the pilot tones. The loop filter 204 generates the phase adjustment value PHADJ having a value that is a fraction of the EPHE value from the estimator 214. The loop filter 204 feeds back only a fraction of the EPHE value in the form of the PHADJ signal to improve the stability of the circuit 200 since the NCO 202 utilizes the PHADJ value to ultimately adjust the phase of each of the samples r(n), as will be appreciated by those skilled in the art.

In operation, assume that the delay circuit 208 initially outputs a zero value for the PHINC value and that the samples r(n) corresponding to a first OFDM symbol are sequentially applied to the summation circuit 210. Also assume the PHADJ value from the loop filter 204 has an initial default value PHADJ-DF and that the first sample r(1) of the first OFDM symbol is applied to the summation circuit 210 within the delay time $\tau_s$ of the delay circuit 208 after the PHADJ-DF value is initially input to the delay circuit. At this point the delay circuit 208 outputs a zero for the PHINC value when the r(1) sample is applied to the summation circuit 210 since the PHADJ-DF value is not yet output from the delay circuit. The summation circuit 210 therefore subtracts zero from the phase of the first sample r(1) and in this way does not adjust the phase value of this sample. Thus, the summation circuit 210 outputs the sample r(n) with no phase correction as the phase-corrected sample ṙ(1) that is supplied to the FFT 212.

After the delay time $\tau_s$, the delay circuit 208 outputs the PHADJ-DF value as the phase increment value PHINC that is applied to the summation circuit 210. This occurs at the same time the second sample r(2) of the current OFDM symbol is applied to the summation circuit 210, causing the circuit 210 to subtract the PHINC value from the phase of this sample. The summation circuit 210 at this point outputs the phase-corrected sample ṙ(2) to the FFT 212, with this phase-corrected sample corresponding to the sample r(2) having the PHINC value subtracted from it phase. Note that while the summation circuit 210 is adjusting the phase of the sample r(2), the output of the delay circuit 208 is also fed back and applied to the summation circuit 206. As a result, the summation circuit 206 sums the PHINC value, which is equal to PHADJ-DF at this point, and the PHADJ-DF value from the loop filter 204 and outputs a value of 2×PHADJ-DF as the accumulated phase value PHAC that is supplied to the delay circuit 208.

After the delay time $\tau_s$, the delay circuit 208 outputs the value 2×PHADJ-DF as the PHINC value that is supplied to the summation circuit 210, which occurs at the same time the sample r(3) is being applied to the summation circuit. The summation circuit 210 therefore subtracts the value 2×PHADJ-DF from the phase of the sample r(3) to thereby supply the phase-corrected sample ṙ(3) to the FFT 212. The NCO 202 continues operating in this manner for all samples r(n) in the first OFDM symbol, and in this way linearly increases the phase offset PHINC that the circuit 210 subtracts from the phase of the sequential samples r(1), r(2), r(3), and so on to r(N). Accordingly, the phase offset of zero is subtracted from the sample r(1), the phase offset subtracted from sample r(2) is PHADJ-DF, phase offset subtracted from sample r(3) is 2×PHADJ-DF, phase offset subtracted from sample r(4) is 3×PHADJ-DF, and so on until the phase offset of (N−1)× PHADJ-DF is subtracted from the final sample r(N) of the OFDM symbol.

Once the summation circuit 210 supplies the phase-corrected sample ṙ(N) to the FFT 212, the FFT calculates the corresponding frequency components R(1)-R(N) for this first OFDM symbol from the phase-corrected samples ṙ(1)-ṙ(N). The FFT 210 outputs these components R(1)-R(N) from the carrier tracking circuit 200 to other circuitry (not shown) in the OFDM receiver for processing. At the same time, the phase error estimator 214 generates a new estimated phase error value EPHE from the ones of these components R(1)-R(N) corresponding to the pilot tones in the OFDM symbol. As previously mentioned, in an IEEE 802.11 system each OFDM symbol includes four pilot tones having known phase values and the estimator 214 compares the actual to the expected phase values for these pilot tones to generate four phase error components, and then takes the average of these four phase error components to generate the EPHE value.

In response to this new EPHE value from the estimator 214, the loop filter 204 takes a fraction of this value to generate the new PHADJ value that is applied to the summation circuit 206. The summation circuit 206 sums this new PHADJ value with the current PHINC value to generate a new PHAC value, which is thereafter output from the delay circuit 208 the delay time $\tau_s$ when the first sample r(1) of the next OFDM symbol is supplied to the summation circuit 210. This is true if the delay through the FFT 212 is relatively short such that this updated value for the EPHE may be fed back to the NCO 202 in time to apply this updated value to the samples r(n) of the next OFDM symbol. In reality, however, the delay through the FFT 212 may be several symbols long such that, eventually, the EPHE calculated for a given OFDM symbol, say symbol X, is used to correct the phases of samples r(n) in an OFDM symbol X+Y where Y is the number of symbol delays through the FFT.

Because the delay time through the FFT 212 can be relatively long, the carrier tracking circuit 200 is always using the estimated phase error EPHE from a prior OFDM symbol to correct the phase errors of samples r(n) for a subsequent OFDM symbol. In fact the FFT 212 may have a pipelined architecture in which several OFDM symbols are applied to the FFT before the frequency components R(1)-R(64) corresponding to a first OFDM symbol are output by the FFT, as alluded to above. In this situation, the phase error EPHE from an initial OFDM symbol is used to correct the phase errors of samples r(n) for an OFDM symbol that is sampled several symbols after that initial symbol. This may result in inaccurate phase adjustments of the samples r(n) in the subsequent OFDM symbol due to the intervening linearly cumulative phase error of the samples.

It should also be noted that in the circuit 200 the phase error estimator 214 is used to estimate an average phase error EPHE that is then used to adjust the phases of the samples r(n) of a subsequent OFDM symbol. Thus, if this average phase error EPHE is considered to be the phase error at the middle one of the samples, which is r(32) in the IEEE 802.11 example currently being used, then an additional 32 samples will have occurred since this estimated phase error value. As a result, the phase adjustment of the NCO 202 will adjust the phases of the samples r(n) of the next OFDM symbol based upon the PHADJ value which was generated from this average phase error value EPHE. This means that the NCO 202 will adjust the phase of the first sample r(n) of the next OFDM symbol by the PHADJ value corresponding to the middle sample r(32) of the prior OFDM symbol, even though thirty two more samples have occurred between this middle sample and the first sample of the next symbol. Recall, the phase shift error from one sample r(n) to another is linearly cumulative due to the frequency offset, and thus the use of this average phase error value PHADJ does not take into account the linearly accumulated phase error between sample location where the error was estimated and the current sample. Note that while the carrier tracking circuit 200 includes the FFT 212 and is discussed as being part of an OFDM receiver, the concepts discussed above apply generally to other types of systems as well. More specifically, the concepts apply to any carrier tracking or other similar circuit where an element (e.g., the FFT 212 in FIG. 2) introduces a delay between the NCO 202 and an output of the element from which a phase error is estimated.

There is a need for a carrier tracking circuit and method that more quickly and more accurately correct for phase errors of a received OFDM or other type of signal due to frequency offset distortion.

SUMMARY OF THE INVENTION

According to one aspect of the present invention, a carrier tracking circuit includes a first phase adjustment circuit coupled to an input of a delay element and a second phase adjustment circuit coupled to an output of the delay element. A phase correction circuit is coupled to output of the delay element is operable to generate a phase adjustment value based upon a data symbol output from the delay element. The phase correction circuit includes a double phase correction circuit to prevent double application of the same phase adjustment value to a symbol by both the first and second phase adjustment circuits. The carrier tracking circuit may be used in OFDM communications systems with each data symbol being an OFDM symbol and with the delay element being an FFT. The carrier tracker circuit also may include a feed forward circuit for correcting the phase error of a given data symbol using a phase error generated from that symbol.

DETAILED DESCRIPTION OF PREFERRED EMBODIMENTS

Figure 3:
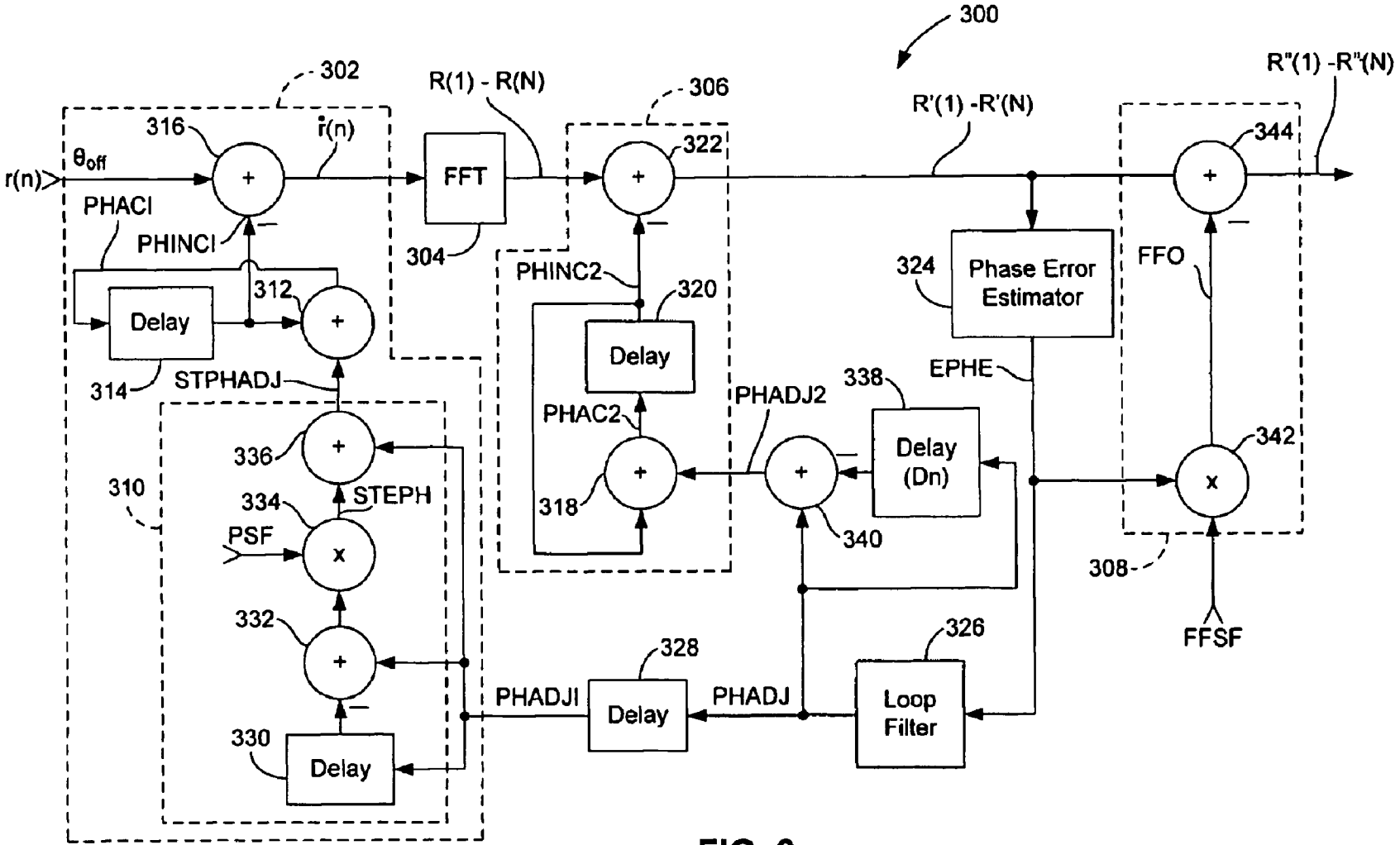
FIG. 3 is a functional block diagram of a carrier tracking circuit including dual numerically controlled oscillators and a feed forward phase coefficient for correcting frequency offset errors according to one embodiment of the present invention.

FIG. 3 is a functional block diagram of a carrier tracking circuit 300 including a first numerically controlled oscillator (NCO) 302 for adjusting the phase of the samples r(n) of an OFDM symbol prior to those samples being input to an FFT 304. The carrier tracking circuit 300 further includes a second NCO 306 for quickly adjusting the phases of the frequency components R(1)-R(64) that are output by the FFT 304 for an OFDM symbol using an estimated phase error EPHE for the immediately preceding OFDM symbol. Moreover, the carrier tracking circuit 300 also includes a feed forward phase correction circuit 308 for immediately adjusting the phase errors of the frequency components R(1)-R(64) of a given OFDM symbol using a scaled estimate of the phase error EPHE for that symbol. The NCO 302 further includes an intrasymbol step phase compensation circuit 310 that generates a step increment in the phase adjustment applied to the samples r(n) by the NCO 302 to compensate for the additional phase error that occurs between the middle sample r(32) of the OFDM symbol for which the estimated phase error EPHE is calculated and the linearly cumulative phase error resulting from the additional 32 samples r(33)-r(64) of the symbol that occur prior to the first sample of the next OFDM symbol, as will be described in more detail below along with all of the components and overall operation of the carrier tracking circuit 300.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

Figure 1:
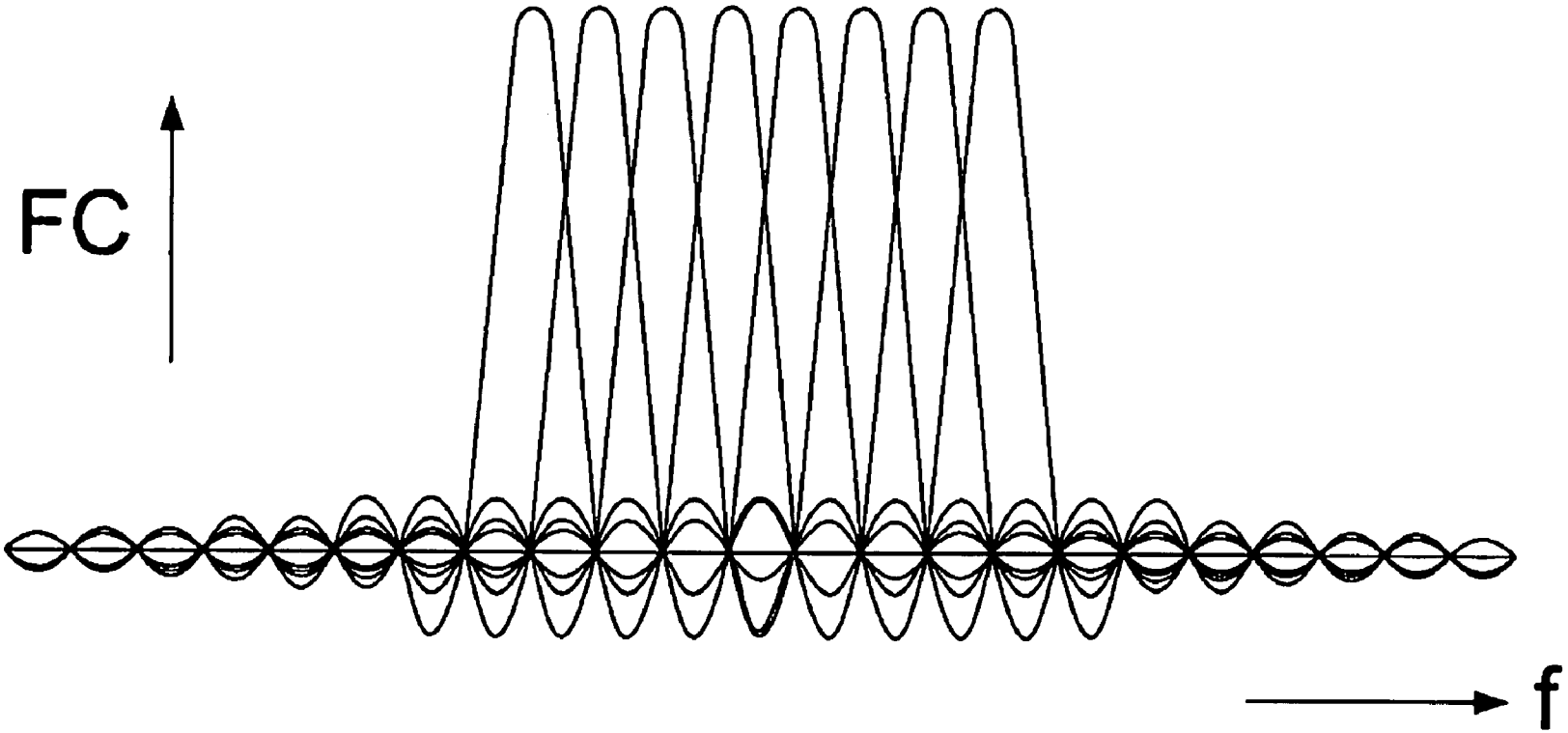
FIG. 1 (PRIOR ART)
FIG. 1 is a graph showing the magnitudes of frequency components for a number of orthogonal subcarriers in an OFDM communications system.
Figure 2:
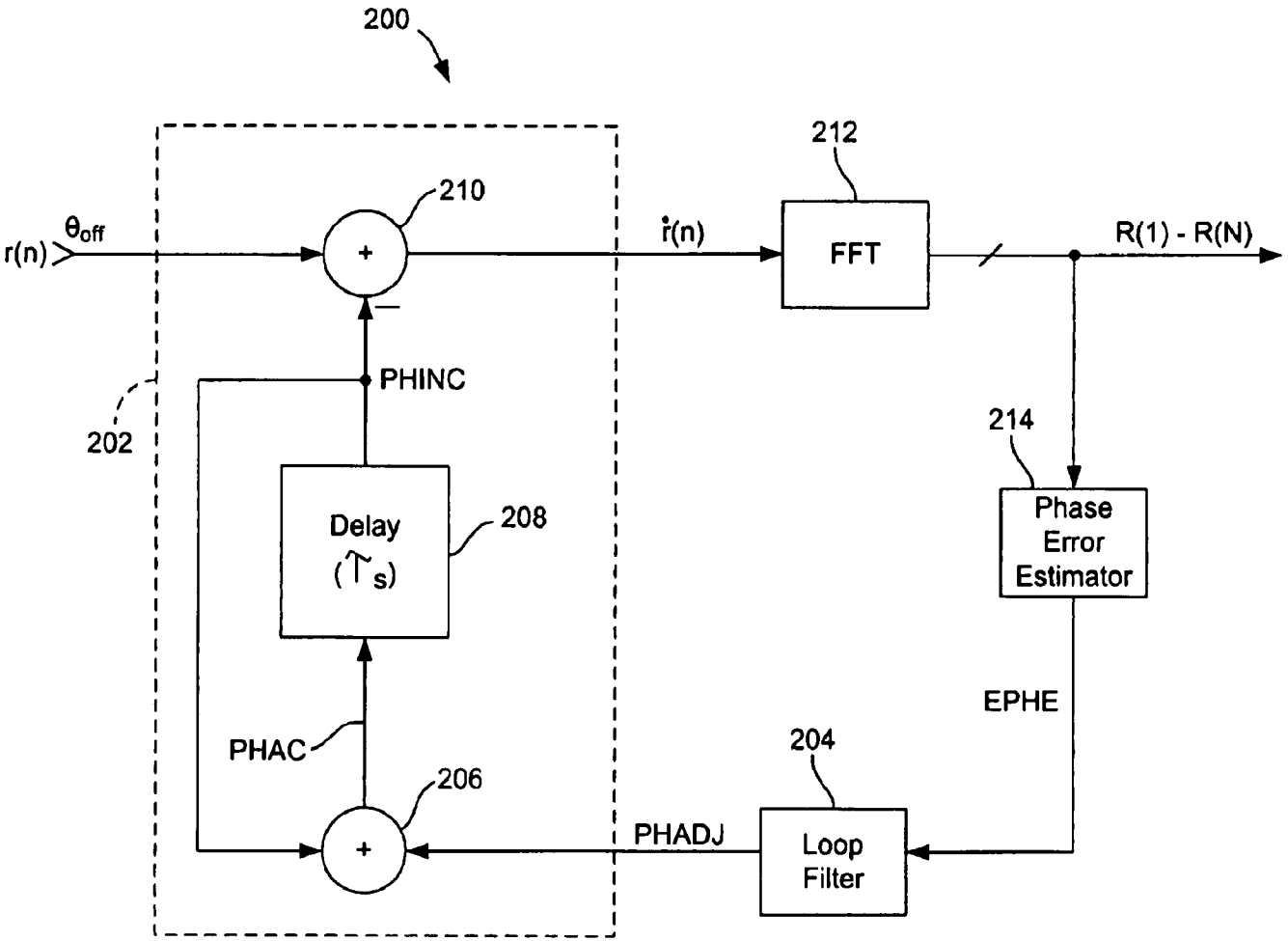
FIG. 2 is a functional block diagram of a conventional carrier tracking circuit contained in an OFDM receiver.

In the carrier tracking circuit 300, the NCO 302 includes a summation circuit 312, a delay circuit 314, and a summation circuit 316 that operate individually and in combination in the same way as the components 206, 208, and 210 previously described with reference to the carrier tracking circuit 200 of FIG. 2. The same is true of a summation circuit 318, delay circuit 320 and summation circuit 322 contained in the second NCO 306. Note that some of the values such as the accumulated phase value PHAC1 and phase increment value PHINC1 include 1's to indicate that they are associated with the first NCO 302 while the corresponding values PHAC2 and PHINC2 include 2's to indicate that they are associated with the second NCO 306. A phase error estimator 324 and loop filter 326 operate in the same way as the corresponding components 214 and 204 previously described with reference to the tracking circuit 200 of FIG. 2.

The intrasymbol step phase compensation circuit 310 receives the phase adjustment value PHADJ from the loop filter 326 through a delay circuit 328, with the value output from a delay circuit being designated PHADJ1. The delay circuit 328 delays the application of a new PHADJ value to the step phase compensation circuit 310 in the form of the PHADJ1 value so that this phase adjustment value is not applied until the start or first sample r(1) of the next OFDM symbol. The step phase compensation circuit 310 includes a delay circuit 330, a summation circuit 332, a multiplier 334 that receives a phase scale factor PSF, and a summation circuit 336 that operate in combination to initially increase the PHADJ1 value by a step phase value STEPH determined by the phase scale factor PSF. This adjustment to the PHADJ1 value is to compensate for the linearly cumulative phase error that has occurred between the middle sample r(32) of the OFDM symbol from which the PHADJ1 value was generated and the first sample of the next OFDM symbol r(1), as will be described in more detail below.

The step phase compensation circuit 310 generates a step phase adjustment value STPHADJ in response to the STEPH and PHADJ1 values. The STPHADJ value sets the PHINC1 value applied to the first sample r(1) of an OFDM symbol to an initial value and operates in combination with the components 312-314 to thereafter linearly increment this initial STPHADJ value by the value PHADJ1 for each subsequent sample r(n) of the OFDM symbol being demodulated.

The carrier tracking circuit 300 further includes a delay circuit 338 that supplies the PHADJ value from the loop filter 326 to a first input of a summation circuit 340 which also receives the PHADJ value directly on a second input. The summation circuit 340 subtracts the value output from the delay circuit 338 from the PHADJ value to thereby provide a phase adjustment value PHADJ2 to the second NCO 306. The delay circuit 338 has a delay $D_n$ which delays application of the PHADJ value to the summation circuit 340 until an OFDM symbol has had its corresponding samples r(t) adjusted by the NCO 302 and the corresponding frequency components R(1)-R(N) have been output from the FFT 304. The function of the delay circuit 338 and summation circuit 340 is to subtract out the PHADJ value from the phase adjustment performed by the second NCO 306 on frequency components R(1)-R(N) of an OFDM symbol that has already had the phases of its samples r(1)-r(n) adjusted by the NCO 202 using this same PHADJ value, as will be described in more detail below. This prevents erroneous double phase adjustment for the same OFDM symbol using the same PHADJ value both before and after the FFT 304. Thus, the delay circuit 338 and summation circuit 340 may be collectively referred to as a double phase correction circuit. As will be explained in more detail below, it should be noted that the second NCO 306 adjusts each of the phase values of the frequency components R(1)-R(N) output from the FFT 304 by the same amount in response to a given PHADJ value.

Finally, the carrier tracking circuit 300 includes the feed forward phase correction circuit 308 that adjusts the phase values of the frequency components R(1)-R(N) for a given OFDM symbol using the estimated phase error EPHE for that symbol. More specifically, the feed forward phase correction circuit 308 includes a multiplier 342 that receives the EPHE value from the phase error estimator 324 and also receives a feed forward scale factor FFSF. In response to the FFSF factor, the multiplier 342 generates a feed forward offset value FFO by multiplying the EPHE value times the FFSF factor. The FFO value is applied to a summation circuit 344 that receives phase corrected frequency components R'(1)-R'(N) from the NCO 206, and subtracts the FFO value from each of these components to generate feed forward phase corrected frequency components R"(1)-R"(N) that are output from the tracking circuit 300 to other circuitry (not shown) in the OFDM receiver.

The overall operation of the carrier tracking circuit 300 will now be described in more detail. Initially, assume the phase error estimator 324 outputs a default EPHE value of zero and the loop filter 326 similarly generates a default PHADJ value of zero in response to this default EPHE value. Also, assume the values initially output from each of the delay circuits 314, 320, 328, 330, and 338 are all zero, and that the phase scale factor value PSF equals 32 and the feed forward scale factor is 0.75 (i.e., less then one). Note the PSF value is assumed to be 32 merely for simplicity's sake, and may be different to take into account cyclic prefixes present in real OFDM symbols. For example, in IEEE 802.11 each symbol may include sixteen samples as the cyclic prefix and thus in this situation the PSF factor would equal 32+16=48 so as to account for the cumulative phase shift from the middle of a first OFDM symbol to the first sample of the next OFDM symbol. Also assume that the received OFDM symbols conform to the IEEE 802.11 standards so that each symbol is modulated on 64 subcarriers and that 64 samples r(1)-r(64) for each symbol are applied to the FFT 304 which, in turn, generates the corresponding 64 frequency components R(1)-R(64) from these samples.

Initially, the samples r(n) corresponding to a first OFDM symbol are applied to the NCO 302. In response the assumed zero default value for the PHADJ1 value, the step phase compensation circuit 310 outputs a zero STPHADJ value to the summation circuit 312. This is true because at this point the output of the delay circuit 330 is zero and thus the summation circuit 332 applies a zero value to the multiplier 324, which multiplies this zero value by the PSF value to thereby generate a zero STEPH value. The summation circuit 336 sums the zero STEPH value with the zero PHADJ1 value to provide the zero STPHADJ value. This zero STPHADJ value results in the summation circuit 312 and delay circuit 314 operating in combination to maintain the value of PHINC1 at zero for all the samples r(n) in the first OFDM symbol. As a result, the NCO 302 does not adjust the phase of any of the samples r(n) of the first OFDM symbol, meaning that the phase corrected samples ṙ(n) equal the samples r(n) for this first OFDM symbol.

Once the phase-corrected samples ṙ(1)-ṙ(64) have been output to the FFT 304, the FFT generates the corresponding frequency components R(1)-R(64). Because of the assumed zero default value of the PHADJ value, the second NCO 306 receives the frequency components R(1)-R(64) and does not adjust the phase of any of the components, meaning the phase corrected frequency components R'(1)-R'(N) output from the summation circuit 322 are equal to the components R(1)-R(64). This is true because zero PHADJ value is applied to the summation circuit 340 which also receives a zero value from the delay circuit 338 and thus outputs a zero for the PHADJ2 value supplied to the NCO 306. In the NCO 306, the delay circuit 320 initially outputs a zero for the PHINC2 value and thus the summation circuit 318 sums the zero PHADJ2 and PHINC2 values and outputs a zero accumulated phase value PHAC2 to the delay 320. Thus, as long as the PHADJ2 value is zero, the PHINC2 value will remain a zero causing the summation circuit 322 to subtract zero phase from the phase values of each of the frequency components R(1)-R(64).

The phase corrected frequency components R'(1)-R'(N) are supplied to the feed forward phase correction circuit 308, and the summation circuit 344 subtracts the FFO value from the phase of each of these components. Also note that at this point, the frequency components R'(1)-R'(N) are applied to the phase error estimator 324, which uses the pilot tones in these components to generate a new EPHE value. This new EPHE value is presumably non-zero, and is supplied to the feed forward phase correction circuit 308. More specifically, the multiplier 342 receives the new EPHE value and the FFSF factor, which is assumed to be 0.75, and thus outputs 0.75EPHE as the FFO value. The summation circuit 344 then subtracts this FFO value for the estimated phase error of the frequency components R'(1)-R'(N) to thereby generate the feed forward phase corrected frequency components R"(1)-R"(N) that are output form the carrier tracking circuit 300. As seen from this description, the feed forward phase correction circuit 308 uses the estimated phase error value EPHE for a given OFDM symbol to correct the corresponding frequency components R'(1)-R'(N) of that symbol. In this way the correction circuit 308 immediately adjusts the phases of the components R'(1)-R'(N) without delay.

At this point, the new nonzero EPHE value is supplied to the loop filter 326 which, in turn, develops a new nonzero PHADJ value from this EPHE value. Also note that at this time the samples r(n) corresponding to the second OFDM symbol are being input to the first NCO 302. Due to the delay circuit 328, the new PHADJ value will not, however, be output as the PHADJ1 value to the first NCO 302 until after the samples from the second OFDM symbol are applied to the first NCO. As a result, the PHADJ1 value remains zero at this point and the first NCO 302 thus subtracts zero PHINC1 values from the phase of each samples r(n), meaning that the phase-corrected samples ṙ(1)-ṙ(N) for the second OFDM symbol have zero phase correction. Once all samples ṙ(1)-ṙ(N) are supplied to the FFT 304, the FFT calculates the FFT of these samples to generate the frequency components R(1)-R(N).

At this point, the delay circuit 328 outputs the PHADJ1 value that is equal to the PHADJ value previously calculated from the first OFDM symbol. In response to the nonzero PHADJ1 value, the summation circuit 332 sums the zero from the delay circuit 330 with the PHADJ1 value and thus at this point outputs the PHADJ1 value to the multiplier 334. The multiplier 334 multiplies the PSF value times the PHADJ1 value to generate the STEPH value. Recall, the PSF value is equal to 32 in the present example so that the STEPH value equals 32×PHADJ1. The summation circuit 336 adds the STEPH value to the PHADJ1 value to generate the STPHADJ value having a value of 33×PHADJ1. This properly accounts for the accumulated phase error from the middle sample r(32) of the first OFDM symbol until first sample r(1) of the third OFDM symbol (i.e., r(32)-r(64) plus one equals 33). The STPHADJ value is input to the delay circuit 314 which, after the delay time $\tau_s$, applies this value as the PHINC1 value to the summation circuit 316 to subtract this amount of phase correction from the first sample r(n) of the third OFDM symbol.

Now that the step phase compensation circuit 310 has adjusted the phase correction PHINC1 that is applied to the first sample r(1) of the third OFDM symbol, subsequent samples r(2)-r(64) should have this initial value incremented by the PHADJ1 value applied to them. The compensation circuit 310 thus removes the STEPH value after this factor has been used to correct the first sample r(1) as follows. After the delay time of the delay circuit 330, which would also be approximately $\tau_s$, the delay circuit outputs the PHADJ1 value and thereby causes the summation circuit 332 to apply a zero value to the multiplier 334. In response to the zero value from the summation circuit 332, the multiplier 334 multiplies the PSF value times zero and outputs a zero for the STEPH value. At this point, the summation circuit 336 adds the zero STEPH value to the PHADJ1 value and thus provides the PHADJ1 value as the step phase adjustment value STPHADJ. The step phase compensation circuit 310 maintains the STPHADJ value equal to the PHADJ value for the remaining samples of the third OFDM symbol. The summation circuit 312, delay circuit 314, and summation circuit 316 thereafter operate in combination as previously described to increment the initial value of the phase increment PHINC1 (33×PHADJ1) by the PHADJ1 value for each subsequent sample. Thus, the PHINC1 value subtracted from the sample r(2) equals 34×PHADJ1, the PHINC1 value subtracted from the sample r(3) equals 35×PHADJ1, and so on. In this way, the NCO 302 utilizes the estimated phase adjustment PHADJ1 obtained from the first OFDM symbol to adjust the phases of the samples r(n) in the third OFDM symbol.

While the NCO 302 is adjusting the phases of the samples r(n) of the third OFDM symbol, the second NCO 306 will utilize the same estimated phase adjustment PHADJ from the loop filter 326 obtained from the first OFDM symbol to adjust the phases of the frequency components R(1)-R(N) of the second OFDM symbol when output from the FFT 304, as will now be explained in more detail. When the PHADJ value generated from the first OFDM symbol is applied to the summation circuit 340, the delay circuit 338 at this point outputs a zero causing the summation circuit 340 to output the PHADJ value as the PHADJ2 value that is applied to the NCO 306. At this point, the summation circuit 318 adds the zero PHINC2 value and the PHADJ2 value to provide the PHAC2 value that is equal to the PHADJ2 value. After the delay time of the delay circuit 320, which will be approximately equal to the rate at which a frequency components R(1)-R(N) for respective OFDM symbols are output from the FFT 304, the delay circuit outputs the PHINC2 value that is equal to the PHADJ2 value. The summation circuit 322 then subtracts the phase PHADJ2 value from the frequency components R(1)-R(N) of the second OFDM symbol output from the FFT 304 to thereby generate the phase corrected frequency components R'(1)-R'(N).

The delay circuit 338 and summation circuit 340 operate to prevent the double correction of phase values for a given OFDM symbol using the same PHADJ value from the loop filter 326. The circuits 338 and 340 accomplish this by the summation circuit 340 subtracting out the already used PHADJ value once the corresponding OFDM symbol is output from the FFT 304. For example, the PHADJ value generated from the first OFDM symbol is utilized by the NCO 302 to correct the phases of the samples r(n) of the third OFDM symbol. As a result, when the frequency components R(1)-R(N) for this third OFDM symbol are output from the FFT 304 the NCO 306 should not utilize the same PHADJ value to adjust the phases of the frequency components. To prevent this double correction, the delay circuit 338 outputs this PHADJ value to the summation circuit 340 after the delay time $D_n$. The delay time $D_n$ corresponds to the time from which a given PHADJ value is output from the loop filter 326 until the time when the FFT 304 outputs the frequency components R(1)-R(N) of the OFDM symbol that was phase corrected by the NCO 302 using this PHADJ value. Therefore, after the delay time $D_n$ the frequency components R(1)-R(N) corresponding to the third OFDM symbol are output from the NCO 302. At this same time, the delay circuit 338 outputs the PHADJ value that was utilized by the NCO 302 to phase correct the third OFDM symbol. The summation circuit 340 then subtracts this PHADJ value output from the delay circuit 338 from the current PHADJ value output from the loop filter 326, which would at this point correspond to a phase correction determined from the second OFDM symbol. The value from the delay circuit 338 may be designated $PHADJ_{n-1}$ and the value from the loop filter 326 designated $PHADJ_n$ to better demonstrate the function of the delay circuit and summation circuit 340 in subtracting out the previous phase adjustment value ($PHADJ_{n-1}$) output from the loop filter 326 from the current value $PHADJ_n$.

In the carrier tracking circuit 300, the feed forward phase correction circuit 308 utilizes the EPHE value for a given OFDM symbol to correct phases of the corresponding frequency components R'(1)-R'(N) of that symbol. Thus, the circuit 300 does not only use estimated phase errors from prior OFDM symbols to correct the phase errors of subsequent OFDM symbols. As a result, the frequency components R"(1)-R"(N) output by the carrier tracking circuit 300 would more quickly have reduced phase errors notwithstanding the delay through the FFT 304. The feed forward phase correction circuit 308 eliminates any delay in phase correction due to the delay through the FFT 304 and allows phase error correction to begin immediately with the first OFDM symbol.

The carrier tracking circuit 300 also includes the second NCO 306 that corrects the phase values of the frequency components R(1)-R(N) of a given OFDM symbol using a phase adjustment value PHADJ determined from the immediately prior OFDM symbol. Recall, in the above example the PHADJ value generated from the first OFDM symbol is used to correct the phases of the frequency components R(1)-R(N) of the second OFDM symbol. This minimizes the time lag between the estimation of a phase correction from a first OFDM symbol and the subsequent OFDM symbol to which this phase correction is applied, which would typically make the corrections more accurate.

The step phase compensation circuit 310 also improves the accuracy of the phase adjustments of the samples r(n) made by the NCO 302. Because the estimated phase error EPHE values from the estimator 324 represent average values for the OFDM symbol from which they were determined, if these values were directly used by the NCO 302 then the linearly cumulative phase error accumulated for that symbol is not taken into account. This would result in less accurate phase correction for the samples r(n) that the NCO 302 corrects using values based upon the estimated phase error value EPHE. Once again, this improves the accuracy of the phase corrections of the carrier tracking circuit 300, which will reduce the bit error rate (BER) of OFDM symbols being transmitted to the OFDM receiver including the carrier tracking circuit.

In the circuit 300, the delays of the delay circuits 314 and 330 are the value $\tau_s$ corresponding to the time between samples r(n) applied to the NCO 302. The delay of the delay circuit 328 is equal to approximately the total time it takes to apply all samples r(n) to the FFT 304, and thus should be approximately $N \times \tau_s$. The delay $D_n$ of the delay circuit 338 is the delay from when PHADJ is output from loop filter 326 until when the components R(1)-R(N) for an OFDM symbol corrected by this PHADJ value are output from FFT. It should also be noted that with the carrier tracking circuit 300, the frequency of the local oscillator in the OFDM receiver is not compensated for directly, but instead is left alone and is compensated for via the carrier tracking circuit. In another embodiment, however, the PHADJ signal could be fed back to control the frequency of the local oscillator that demodulates the modulated RF signal received by the receiver.

Figure 4:
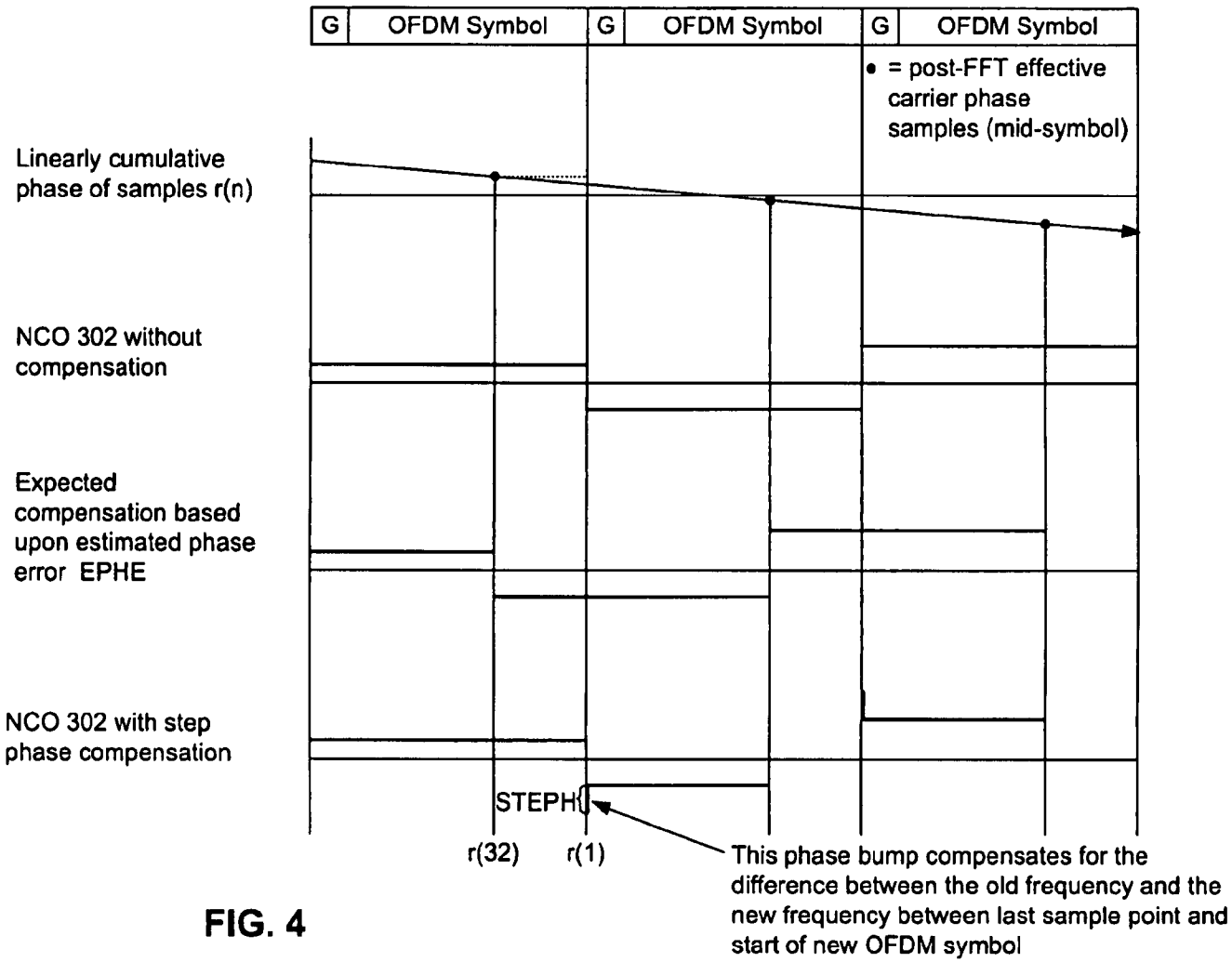
FIG. 4 is a graph showing the operation of the intrasymbol step phase compensation circuit of Figure.

FIG. 4 is a graph illustrating the operation of the intrasymbol step phase compensation circuit 310 of FIG. 3. At the top are shown three OFDM symbols including a guard interval G that is associated with each symbol that is associated with each symbol to prevent intersymbol interference, as will be appreciated by those skilled in the art. A top line indicates the linearly cumulative phase from OFDM symbol to OFDM symbol. The second set of lines from the top indicate the phase correction the NCO 302 would apply without step wise compensation, which would be constant for each OFDM symbol since the incrementally increasing PHINC1 value compensates for the linearly changing cumulative phase. The third set of lines from the top show the expected compensation based upon the estimated phase error values EPHE. As seen each EPHE value is effectively an estimate of the phase correction based upon the middle sample of the OFDM symbol. Finally, the bottom set of lines indicate the one time step phase value STEPH introduced by the compensation circuit 310 at the beginning of each OFDM symbol. FIG. 4 illustrates the bump in the phase correction as the value STEPH although the actual value would be STEPH+PHADJ1 as previously discussed with reference to FIG. 3. The STEPH value is thus seen to compensate for the linearly cumulative phase error that has accumulated between approximately the sample r(32) of the OFDM symbol for which the phase correction was determined and the first sample r(1) of the next OFDM symbol.

Note that the phase scale factor PSF is applied to the compensation circuit 310 by an external circuit (not shown) and has a value that is dependent upon the parameters of the OFDM symbols being received. For example, recall that the average phase error EPHE from the phase error estimator 324 is considered to be the phase error at the middle one of the samples of an OFDM symbol, which is r(32) in the IEEE 802.11 example being used herein. In this situation, an additional 32 samples will have occurred since this estimated phase error value EPHE was determined. As a result, the PHADJ value from the loop filter 326, which has a value determined by the EPHE value, corresponds to an estimated phase error for the middle sample r(32). This value should therefore be multiplied by 32 to account for the additional 32 samples r(33)-r(64) that have been processed since this error was estimated. The summation circuit 312 then increments this value by one so that the phase adjustment applied to the first sample r(1) of the next OFDM symbol is set to the expected proper linearly cumulative value for this first sample.

Figure 5:
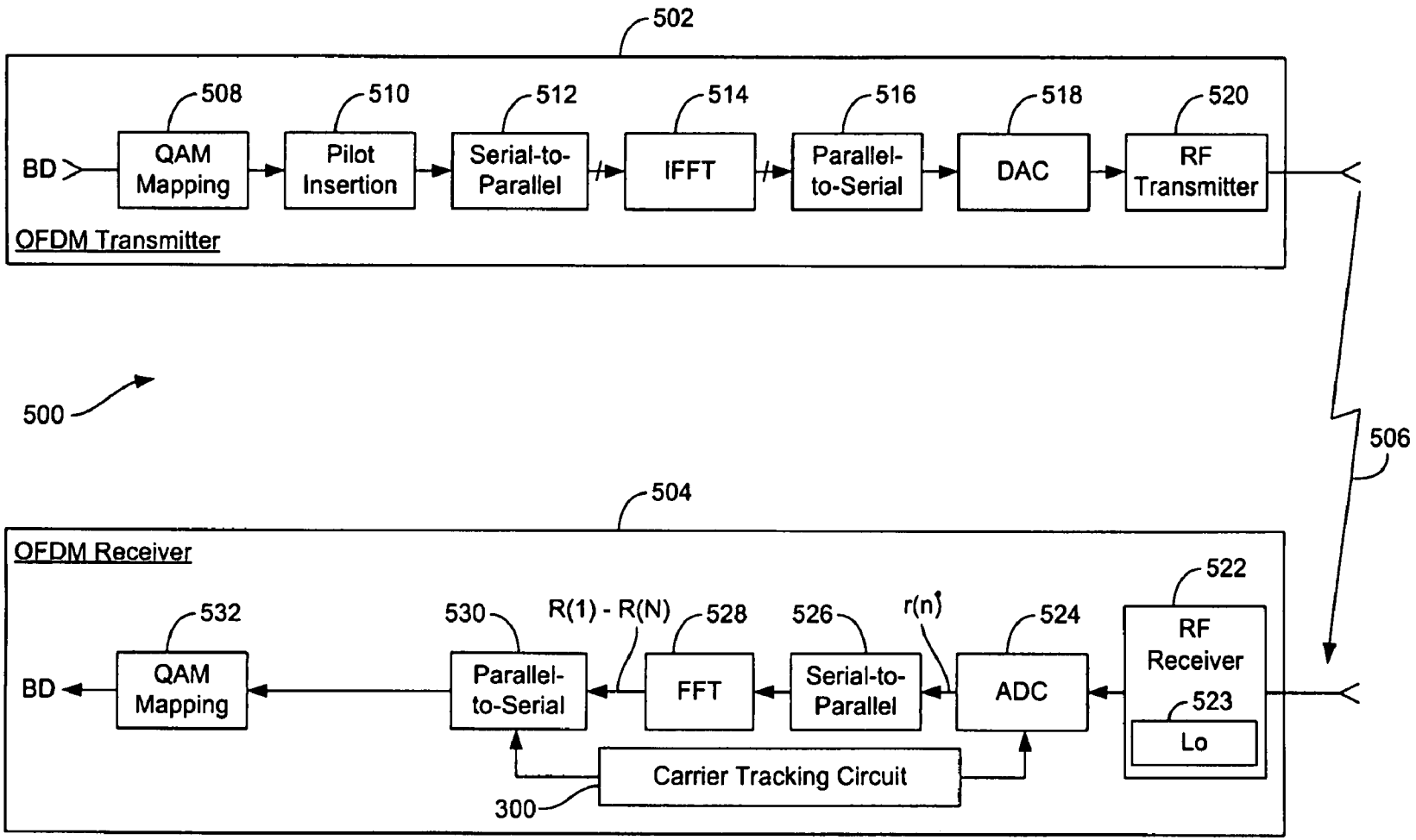
FIG. 5 is a functional block diagram of an OFDM communications system including an OFDM receiver containing the carrier tracking circuit of FIG. 3 according to one embodiment of the present invention.

FIG. 5 is a functional block diagram of an OFDM communications system 500 including an OFDM transmitter 502 and an OFDM receiver 504 containing the carrier tracking circuit 300 of FIG. 3 according to one embodiment of the present invention. The transmitter 502 communicates with the receiver 504 over a wireless channel 506, and includes a QAM mapping circuit 508 that receives binary data BD and maps this data into QAM symbols. A pilot insertion circuit 510 inserts the required pilot tones into the QAM symbols and applies this data to a serial-to-parallel converter 512 which supplies a plurality of complex values in parallel to an inverse fast Fourier transform (IFFT) circuit 514.

The IFFT 514 outputs complex values representing the phase and magnitude of the corresponding time-domain subcarrier signals. A serial-to parallel converter 518 applies the parallel complex values output from the IFFT 514 sequentially to a digital to analog converter 518. The digital to analog converter 518 generates an analog time domain OFDM signal in response to the sequentially received digital values and this OFDM signal is applied to an RF transmitter 520, which modulates an RF carrier signal in response to the analog OFDM signal from the digital to analog converter. This modulated RF carrier signal is then communicated over the wireless channel 506 to the receiver 504.

In the receiver 504, an RF receiver 522 including a local oscillator 523 demodulates the modulated RF carrier signal to generate the time domain OFDM signal. This time domain OFDM signal is applied to an analog to digital converter 524 which samples the time domain OFDM signal to generate the phase corrected samples $\dot{r}(n)$ under control of the carrier tracking circuit 300. The samples $\dot{r}(n)$ are applied to a serial-to-parallel converter 526 which sequentially receives the samples and then applies them in parallel to an FFT 528. The FFT 528 performs a fast Fourier transform on the samples to thereby generate the frequency components R(1)-R(N). The frequency components R(1)-R(N) are applied to a parallel-to-serial converter 530 which sequentially provides the frequency components to a QAM demapping circuit 532 that then utilizes the frequency components to map the QAM symbols represented by the frequency components back into the original binary data BD.

Even though various embodiments and advantages of the present invention have been set forth in the foregoing description, the above disclosure is illustrative only, and changes may be made in detail and yet remain within the broad principles of the present invention. Moreover, the functions performed by components contained in the carrier tracking circuit 300 can be combined to be performed by fewer elements, separated and performed by more elements, or combined into different functional blocks depending upon the actual implementation of the circuit. For example, the carrier tracking circuit 300 does not include the intrasymbol step phase compensation circuit 310 in another embodiment and in still a further embodiment the FFT 304 is replaced by another circuit that introduces a delay and the samples r(n) correspond to samples of received signal other than an OFDM symbol. One skilled in the art will also understand circuitry and software that may be utilized to form each of the components in the carrier tracking circuit 300 and in the OFDM communications system 500. Also one skilled in the art will realize that other frequency analysis algorithms other than the FFT may be used in place of the FFT 304, such as the discrete Fourier transform (DFT) or other algorithms for calculating the DFT of a signal. The present invention is accordingly to be limited only by the appended claims.

What is claimed is:

1. A carrier tracking circuit, comprising:

a first phase adjustment circuit having a phase adjustment input, an input sample input, and an output;

a delay element having an input coupled to the output of the first phase adjustment circuit and having an output;

a second phase adjustment circuit having a component input coupled to the output of the delay element, a phase adjustment input, and an output;

a phase correction circuit having an input coupled to the output of the second phase adjustment circuit and a first output coupled to the phase adjustment input of the first phase adjustment circuit, the phase correction circuit including a double phase correction circuit having an input coupled to the first output and having a second output coupled to the phase adjustment input of the second phase adjustment circuit; and a feed forward phase correction circuit having a first control input adapted to receive a feed forward scale factor signal and a second control input coupled to the first output of the phase correction circuit, and having a component input coupled to the output of the second phase adjustment circuit.

2. The carrier tracking circuit of claim 1 wherein the phase correction circuit further comprises:

a phase estimation circuit having an input coupled to the output of the second phase adjustment circuit and having an output;

a loop filter having an input coupled to the output of the phase estimation circuit and having an output; and a delay circuit having an input coupled to the output of the loop filter and an output coupled to the phase adjustment input of the first phase adjustment circuit.

3. A carrier tracking circuit, comprising:

a first phase adjustment circuit adapted to receive input samples and operable to adjust a phase value of each input sample responsive to a first phase adjustment signal to thereby generate a corresponding phase-adjusted input sample, with groups of the input samples corresponding to sequentially received symbols;

a delay element coupled to the first phase adjustment circuit and operable to generate a group of output components responsive to a group of the phase-adjusted input samples corresponding to a particular symbol;

a second phase adjustment circuit coupled to the delay component to receive the output components, the second phase adjustment circuit operable to adjust a phase value of each output component responsive to a second phase adjustment signal to thereby generate phase-adjusted output components corresponding to a particular symbol; and a phase correction circuit coupled to the first and second phase adjustment circuits, the phase correction circuit operable to generate the first phase adjustment signal having a value that is a function of the values of the phase-adjusted output components for a particular symbol, and operable to delay application of the phase adjustment signal to the first phase adjustment circuit for approximately a first delay time at which a first input sample of a subsequent symbol is applied to the first phase adjustment circuit, and the phase correction circuit further operable to generate the second phase adjustment signal having a value that is equal to the value the first phase adjustment signal for a second delay time and that is thereafter equal to a new value of the first phase adjustment signal associated with a subsequent symbol minus an initial value of the first phase adjustment signal associated with the prior symbol, the second delay time being equal to approximately the time between when the initial value of the first phase adjustment signal is generated and the time when the output components for a subsequent symbol that have been phase adjusted using that initial value are output from the delay element.

4. The carrier tracking circuit of claim 3 wherein the phase correction circuit further comprises a feed forward phase correction circuit coupled to the output of the second phase adjustment circuit, the feed forward phase correction circuit operable to adjust the phase values of the phase adjusted output components for a particular symbol using the first phase adjustment signal generated from the phase adjusted output components of that symbol.

5. The carrier tracking circuit of claim 4 wherein the feed forward phase correction circuit generates a feed forward offset phase by multiplying the first phase adjustment signal by a feed forward scale factor, and subtracts the feed forward offset phase from the phase values of the phase adjusted output components.

6. The carrier tracking circuit of claim 5 wherein the feed forward scale factor is less than one.

7. The carrier tracking circuit of claim 6 wherein the feed forward phase correction circuit comprises:

a summation circuit that receives the phase adjusted output components on a first input and that receives the feed forward offset phase on a second input, the summation circuit operable to subtract the offset phase from the phase values of each output component to provide on an output feed forward phase adjusted output components; and a multiplier having a first input coupled to receive the first phase adjustment signal, a second input coupled to receive the feed forward scale factor, and an output coupled to the second input of the summation circuit, the multiplier operable to multiply the first phase adjustment signal times the feed forward scale factor to provide the feed forward offset phase to the summation circuit.

8. The carrier tracking circuit of claim 3 wherein the first phase adjustment circuit further comprises a step phase compensation circuit adapted to receive a phase step factor signal and being operable to generate a step phase value in response to the first phase adjustment signal and the phase step factor signal, and wherein the first phase adjustment circuit is operable to subtract the step phase value plus a value of the first phase adjustment signal from the first input sample of each symbol.

9. The carrier tracking circuit of claim 8 wherein the first phase adjustment circuit is further operable to incrementally increase the value subtracted from each subsequent input sample in a given symbol by the value of the first phase adjustment signal.

10. The carrier tracking circuit of claim 3 wherein the first phase adjustment circuit further comprises a numerically controlled oscillator and wherein the second phase adjustment circuit comprises a numerically-controlled oscillator.

11. The carrier tracking circuit of claim 3 wherein the delay element comprises a fast Fourier transform (FFT) element and wherein a group of the phase-corrected input samples correspond to a time domain sample of an OFDM symbol, the FFT element being operable to generate as output components a group of frequency components for the OFDM symbol in response to the group of phase-corrected input samples.

12. An OFDM receiver, comprising:

a radio frequency receiver circuit;

an analog-to-digital converter coupled to the radio frequency receiver circuit;

a serial-to-parallel converter coupled to the analog-to-digital converter;

an FFT circuit coupled to the serial-to-parallel converter;

a parallel-to-serial converter coupled to the output of the FFT circuit;

a symbol demodulation circuit; and a carrier tracking circuit coupled to the analog-to-digital converter and to the parallel-to-serial converter, the carrier tracking circuit including, a first phase adjustment circuit coupled to receive input samples from the analog-to-digital converter and operable to adjust a phase value of each input sample responsive to a first phase adjustment signal to thereby generate a corresponding phase-adjusted input sample, with groups of the input samples corresponding to sequentially received OFDM symbols;

a second phase adjustment circuit coupled to the FFT circuit to receive output components from the FFT, the second phase adjustment circuit operable to adjust a phase value of each output component responsive to a second phase adjustment signal to thereby generate phase-adjusted output components corresponding to a particular OFDM symbol; and a phase correction circuit coupled to the first and second phase adjustment circuits, the phase correction circuit operable to generate the first phase adjustment signal having a value that is a function of the values of the phase-adjusted output components for a particular OFDM symbol, and operable to delay application of the phase adjustment signal to the first phase adjustment circuit for approximately a first delay time at which a first input sample of a subsequent OFDM symbol is applied to the first phase adjustment circuit, and the phase correction circuit further operable to generate the second phase adjustment signal having a value that is equal to the value the first phase adjustment signal for a second delay time and that is thereafter equal to a new value of the first phase adjustment signal associated with a subsequent OFDM symbol minus an initial value of the first phase adjustment signal associated with the prior OFDM symbol, the second delay time being equal to approximately the time between when the initial value of the first phase adjustment signal is generated and the time when the output components for a subsequent OFDM symbol that have been phase adjusted using that initial value are output from the FFT.

13. The OFDM receiver of claim 12 wherein the phase correction circuit further comprises a feed forward phase correction circuit coupled to the output of the second phase adjustment circuit, the feed forward phase correction circuit operable to adjust the phase values of the phase adjusted output components for a particular OFDM symbol using the first phase adjustment signal generated from the phase adjusted output components of that OFDM symbol.

14. The OFDM receiver of claim 12 wherein the first phase adjustment circuit is further operable to incrementally increase the value subtracted from each subsequent input sample in a given OFDM symbol by the value of the first phase adjustment signal.

15. The OFDM receiver of claim 12 wherein the first and second phase adjustment circuits each include numerically controlled oscillators.

16. The OFDM receiver of claim 12 wherein the symbol demodulation circuit comprises a QAM demapping circuit.

17. An OFDM communications system, comprising:

an OFDM transmitter operable to communicate a modulated OFDM signal over a wireless communications channel; and an OFDM receiver including, a radio frequency receiver circuit adapted to receive the modulated OFDM signal;

an analog-to-digital converter coupled to the radio frequency receiver circuit;

a serial-to-parallel converter coupled to the analog-to-digital converter;

an FFT circuit coupled to the serial-to-parallel converter;

a parallel-to-serial converter coupled to the output of the FFT circuit;

a symbol demodulation circuit; and a carrier tracking circuit coupled to the analog-to-digital converter and to the parallel-to-serial converter, the carrier tracking circuit including, a first phase adjustment circuit coupled to receive input samples from the analog-to-digital converter and operable to adjust a phase value of each input sample responsive to a first phase adjustment signal to thereby generate a corresponding phase-adjusted input sample, with groups of the input samples corresponding to sequentially received OFDM symbols;

a second phase adjustment circuit coupled to the FFT circuit to receive output components from the FFT, the second phase adjustment circuit operable to adjust a phase value of each output component responsive to a second phase adjustment signal to thereby generate phase-adjusted output components corresponding to a particular OFDM symbol; and a phase correction circuit coupled to the first and second phase adjustment circuits, the phase correction circuit operable to generate the first phase adjustment signal having a value that is a function of the values of the phase-adjusted output components for a particular OFDM symbol, and operable to delay application of the phase adjustment signal to the first phase adjustment circuit for approximately a first delay time at which a first input sample of a subsequent OFDM symbol is applied to the first phase adjustment circuit, and the phase correction circuit further operable to generate the second phase adjustment signal having a value that is equal to the value the first phase adjustment signal for a second delay time and that is thereafter equal to a new value of the first phase adjustment signal associated with a subsequent OFDM symbol minus an initial value of the first phase adjustment signal associated with the prior OFDM symbol, the second delay time being equal to approximately the time between when the initial value of the first phase adjustment signal is generated and the time when the output components for a subsequent OFDM symbol that have been phase adjusted using that initial value are output from the FFT.

18. The OFDM communications system of claim 17 wherein the phase correction circuit further comprises a feed forward phase correction circuit coupled to the output of the second phase adjustment circuit, the feed forward phase correction circuit operable to adjust the phase values of the phase adjusted output components for a particular OFDM symbol using the first phase adjustment signal generated from the phase adjusted output components of that OFDM symbol.

19. The OFDM communications system of claim 17 wherein the first phase adjustment circuit is further operable to incrementally increase the value subtracted from each subsequent input sample in a given OFDM symbol by the value of the first phase adjustment signal.

20. The OFDM communications system of claim 17 wherein the first and second phase adjustment circuits each include numerically controlled oscillators.

21. The OFDM communications system of claim 17 wherein the symbol demodulation circuit comprises a QAM demapping circuit.

22. A method of correcting for frequency offset in a communications system that communicates data symbols, the method comprising:

generating a first group of frequency components that correspond to a data symbol by applying an FFT algorithm to a group of time domain input samples that correspond to the symbol;

calculating a phase adjustment value from the group of frequency components;

adjusting the phase values of subsequent groups of time domain input samples corresponding to subsequent symbols in using the calculated phase adjustment value for a prior symbol, the phase values of the subsequent time domain input samples being adjusted prior to applying the FFT algorithm to these input samples;

adjusting the phase values of the groups of frequency components generated by the FFT algorithm for a given symbol using the phase adjustment value calculated from the frequency components of a prior symbol;

when a given symbol has the phase values of the corresponding time domain input samples adjusted using the phase adjustment value calculated from a particular prior symbol, compensating for this adjustment to the time domain input samples when adjusting the phase values of the group of frequency components corresponding to this given symbol;

wherein each group of time domain input samples includes r(1)-r(N) input samples; and wherein adjusting the phase values of subsequent groups of time domain input samples includes, subtracting a phase increment from the phase values for each of the time domain input samples r(1)-r(N) in a group, the phase increment linearly increasing from the first input sample r(1) to the last input sample r(N).

23. The method of claim 22 wherein subtracting a phase increment further comprises subtracting a step phase value from the first input sample r(1), the step phase value being determined as function of the how each phase adjustment value is calculated.

24. The method of claim 23 wherein each phase adjustment value is calculated to represent the average phase error corresponding approximately to the phase error of the r(N/2) input sample, and the step phase value is equal to N/2 plus an offset value plus an incremental value to be linearly applied to the input samples having their phase values adjusted.

25. The method of claim 22 wherein compensating for the adjustment to the time domain input samples when a given symbol has the phase values of the corresponding time domain input samples adjusted using the phase adjustment values calculated from a particular prior symbol comprises subtracting the phase adjustment value generated from the particular prior symbol from a current phase adjustment value and using the difference to adjust the phase values of the frequency components corresponding to the particular symbol when these components are output from the FFT.

26. The method of claim 22 wherein each symbol comprises an OFDM symbol.

27. A method of correcting for frequency offset in an OFDM communications system that communicates OFDM symbols, each OFDM symbol including a plurality of corresponding time domain input samples and a plurality of corresponding frequency components generated by applying a frequency analysis algorithm to the time domain input samples, each time domain input sample and each frequency component having an associated phase and magnitude, the method comprising:

calculating a phase adjustment value from the frequency components of each OFDM symbol;

adjusting the phases of the time domain input samples of at least one prior OFDM symbol using the calculated phase adjustment value for a prior OFDM symbol prior to applying the input samples to the frequency analysis algorithm;

adjusting the phases of the frequency components of at least one prior OFDM symbol using the calculate phase adjustment value for a prior OFDM symbol; and adjusting the phases of the frequency components of a given OFDM symbol using the calculated phase adjustment value for that OFDM symbol;

wherein adjusting the phases of the frequency components of a given OFDM symbol using the calculated phase adjustment value for that OFDM symbol comprises:

multiplying the calculated phase adjustment value by a feed forward scale factor to generate a feed forward offset value; and subtracting the feed forward offset value from each of the frequency components of the given OFDM symbol.

28. The method of claim 27 wherein adjusting the phases of the time domain input samples of a given OFDM symbol comprises subtracting a linearly increasing phase increment from each of the input samples.

29. The method of claim 28 wherein the phase of the first sample of the OFDM symbol is further adjusted by subtracting a step phase value.

30. The method of claim 29 wherein the step phase value is calculated using one half the number of input samples for each OFDM symbol plus an offset value determined by the number of cyclic prefix samples in the OFDM symbol.

*31. A method comprising:*

*generating a first phase offset value for a multicarrier frame and a subsequent first phase offset value for a subsequent multicarrier frame, wherein the first phase offset value and the subsequent first phase offset value are representative of an average phase offset of the multicarrier frame and the subsequent multicarrier frame, and wherein the first phase offset value and the subsequent first phase offset value are generated with a phase estimation circuit;*

*determining a step phase offset that accumulates during reception of the multicarrier frame, wherein the step phase offset is determined with a step phase compensation circuit;*

*applying a first corrected phase offset to a set of time-domain input samples of the multicarrier frame with a first summation circuit to create a set of phase-corrected time-domain samples, wherein the first corrected phase offset includes the first phase offset value and the step phase offset;*

*converting the set of phase-corrected time-domain samples to a set of frequency domain samples with a frequency transform;*

*applying a second phase offset value to the set of frequency domain samples with a second summation circuit, wherein the second phase offset value is based on the first phase offset value and the subsequent first phase offset value.*

*32. The method of claim 31 wherein applying the first corrected phase offset comprises subtracting a linearly increasing phase increment from each of the set of time-domain input samples.*

*33. The method of claim 31 wherein the step phase offset is calculated using one half the number of input samples for each symbol plus an offset value determined by the number of cyclic prefix samples in the symbol.*

*34. An apparatus comprising:*

*a phase error estimator configured to generate a first phase offset value for a multicarrier frame based on pilot tones, wherein the first phase offset value represents an average phase offset, and wherein the phase error estimator is further configured to determine a subsequent first phase offset value;*

*a first numerically controlled oscillator configured to determine a step phase offset that accumulates during reception of the multicarrier frame and to apply a first corrected phase offset to a set of time-domain input samples of the multicarrier frame to create a set of phase-corrected time-domain samples, wherein the first corrected phase offset includes the first phase offset value and the step phase offset;*

*a delay element configured to convert the set of phase-corrected time-domain samples to a set of frequency domain samples with a frequency transform; and*

*a second numerically controlled oscillator configured to apply a second phase offset value to the set of frequency domain samples, wherein the second phase offset value is based on the first phase offset value and the subsequent first phase offset value.*

*35. The apparatus of claim 34 further comprising a feed forward phase correction circuit configured to adjust phase values of phase adjusted output components for a particular OFDM symbol using a first phase adjustment signal generated from the phase error estimator.*

*36. The apparatus of claim 34 wherein the first numerically controlled oscillator is further configured to incrementally increase a value subtracted from each subsequent input sample in a given OFDM symbol by the value of a first phase adjustment signal.*

*37. The apparatus of claim 34 further comprising a symbol demodulation circuit configured to dempap a QAM symbol.*

*38. A carrier tracking circuit, comprising:*

*a first phase adjustment circuit configured to:*

*receive input samples;*

*adjust a phase value of each of the input samples responsive to a first phase adjustment signal; and*

*generate corresponding phase-adjusted input samples;*

*a delay element configured to generate a group of output components responsive to a group of the phase-adjusted input samples;*

*a second phase adjustment circuit configured to adjust a phase value of each output component of the group of output components responsive to a second phase adjustment signal to generate phase adjusted output components;*

*a phase correction circuit configured to:*

*generate an estimated phase adjustment signal having a value that is a function of values of the phase-adjusted output components;*

*generate the first phase adjustment signal based on the estimated phase adjustment signal;*

*delay application of the first phase adjustment signal to the first phase adjustment circuit for approximately a first delay time; and*

*generate the second phase adjustment signal having a value that is equal to a value of the estimated phase adjustment signal for a second delay time; and*

*a feed forward phase correction circuit configured to adjust phase values of phase adjusted output components for a particular OFDM symbol using the first phase adjustment signal.*

*39. The carrier tracking circuit of claim 38 wherein the feed forward phase correction circuit is further configured to generate a feed forward offset phase by multiplying the first phase adjustment signal by a feed forward scale factor, and subtract the feed forward offset phase from the phase adjusted output components.*

*40. The carrier tracking circuit of claim 39 wherein the feed forward scale factor is less than one.*

*41. The carrier tracking circuit of claim 40 wherein the feed forward phase correction circuit comprises:*

*a summation circuit configured to subtract the feed forward offset phase from phase values of the output components to provide output feed forward phase adjusted output components; and*

*a multiplier operable to multiply the first phase adjustment signal by the feed forward scale factor to provide the feed forward offset phase to the summation circuit.*

*42. The carrier tracking circuit of claim 38 wherein the first phase adjustment circuit comprises a step phase compensation circuit configured to receive a phase step factor signal and generate a step phase value in response to the first phase adjustment signal and the phase step factor signal, and wherein the first phase adjustment circuit is configured to subtract the step phase value plus a value of the first phase adjustment signal from a first input sample of a symbol.*

*43. The carrier tracking circuit of claim 42 wherein the first phase adjustment circuit is further configured to incrementally increase a value subtracted from a subsequent input sample in a given symbol by the value of the first phase adjustment signal.*

*44. The carrier tracking circuit of claim 38 wherein the first phase adjustment circuit further comprises a numerically controlled oscillator and wherein the second phase-adjustment circuit comprises a numerically-controlled oscillator.*

*45. The carrier tracking circuit of claim 38 wherein the delay element comprises a fast Fourier transform (FFT) element configured to generate as output components a group of frequency components for an OFDM symbol in response to the group of phase-adjusted input samples.*

*46. A method comprising:*

*generating a first group of frequency components that correspond to a data symbol;*

*calculating a phase adjustment value from the first group of frequency components with a phase estimation circuit;*

*adjusting phase values of subsequent groups of time domain input samples corresponding to subsequent symbols with a first phase correction circuit based on the phase adjustment value;*

*adjusting phase values of the first group of frequency components with a second phase correction circuit based on a phase adjustment value calculated from frequency components of a prior symbol, wherein the frequency components are calculated with a frequency transform;*

*compensating for the adjusting of phase values of the first group of frequency components;*

*wherein the subsequent groups of time domain input samples include r(1)-r(N) input samples, and*

*wherein adjusting the phase values of the subsequent groups of time domain input samples includes subtracting a phase increment from phase values for each of the input samples r(1)-r(N), wherein the phase increment linearly increases from a first input sample r(1) to a last input sample r(N).*

*47. The method of claim 46 wherein subtracting the phase increment further comprises subtracting a step phase value from the first input sample r(1), wherein the step phase value is determined based on how a phase adjustment value is calculated.*

*48. The method of claim 47 wherein the phase adjustment value is calculated to represent an average phase error corresponding approximately to a phase error of a r(N/2) input sample, and the step phase value is equal to N/2 plus an offset value plus an incremental value to be linearly applied to the input samples having their phase values adjusted.*

*49. The method of claim 46 wherein compensating for the adjusting of the phase values comprises subtracting a phase adjustment value generated from a particular prior symbol from a current phase adjustment value and using the difference to adjust the phase values of the first group of frequency components.*

*50. The method of claim 46 wherein the data symbol comprises an OFDM symbol.*

*51. An apparatus comprising:*

*a phase error estimation means for generating a first phase offset value for a multicarrier frame and a subsequent first phase offset value for a subsequent multicarrier frame, wherein the first phase offset value and the subsequent first phase offset value are representative of an average phase offset of the multicarrier frame and the subsequent multicarrier frame;*

*a first oscillator means for determining a step phase offset that accumulates during reception of the multicarrier frame and applying a first corrected phase offset to a set of time-domain input samples of the multicarrier frame to create a set of phase-corrected time-domain samples, wherein the first corrected phase offset includes the first phase offset value and the step phase offset;*

*a delay means for converting the set of phase-corrected time-domain samples to a set of frequency domain samples with a frequency transform; and*

*a second oscillator means configured to apply a second phase offset value to the set of frequency domain samples, wherein the second phase offset value is based on the first phase offset value and the subsequent first phase offset value.*

*52. The apparatus of claim 51 further comprising a feed forward phase correction means for adjusting phase values of phase adjusted frequency domain samples for a particular OFDM symbol using a first phase adjustment signal.*

*53. The apparatus of claim 52 further comprising a means for incrementally increasing a value subtracted from each subsequent input sample in a given OFDM symbol by the value of the first phase adjustment signal.*

*54. The apparatus of claim 51 further comprising a symbol demodulation means for demapping QAM symbols.*

* * * * *

UNITED STATES PATENT AND TRADEMARK OFFICE

CERTIFICATE OF CORRECTION

PATENT NO. : RE43,131 E
APPLICATION NO. : 12/658033
DATED : January 24, 2012
INVENTOR(S) : Shearer, III et al.

It is certified that error appears in the above-identified patent and that said Letters Patent is hereby corrected as shown below:

Title Page, item (54), and Column 1, line 4, in Title, delete "FEEDFORWARD" and insert -- FEED FORWARD --.

Column 14, line 64, in Claim 3, delete "value the" and insert -- value of the --.

Column 15, line 60, in Claim 10, delete "numerically-controlled" and insert -- numerically controlled --.

Column 16, line 41, in Claim 12, delete "value the" and insert -- value of the --.

Column 17, line 51, in Claim 17, delete "value the" and insert -- value of the --.

Column 19, lines 23-24, in Claim 27, delete "using the calculate phase adjustment value" and insert -- using the calculated phase adjustment value --.

Column 20, line 53, in Claim 37, delete "dempap" and insert -- demap --.

Column 21, lines 50-51, in Claim 44, delete "phase-adjustment" and insert -- phase adjustment --.

Column 21, line 51, in Claim 44, delete "numerically-controlled" and insert -- numerically controlled --.

Signed and Sealed this
Fourteenth Day of August, 2012

David J. Kappos

David J. Kappos
*Director of the United States Patent and Trademark Office*